United States Patent [19]

Ohara

[11] Patent Number: 5,050,968
[45] Date of Patent: Sep. 24, 1991

[54] OPTICAL SHUTTER USING MAGNETO-OPTICAL MATERIALS

[75] Inventor: Tetsuo Ohara, Yokohama, Japan

[73] Assignee: Eastman Kodak Company, Rochester, N.Y.

[21] Appl. No.: 488,176

[22] Filed: Mar. 5, 1990

[30] Foreign Application Priority Data

Sep. 22, 1989 [JP] Japan .................. 1-246733

[51] Int. Cl.$^5$ .................. G01R 33/032; G02F 1/09; G02B 5/30
[52] U.S. Cl. .................. 359/281; 359/500; 359/245; 365/122
[58] Field of Search .......... 350/376, 406, 391, 355; 356/365; 365/122

[56] References Cited

U.S. PATENT DOCUMENTS

| | | | |
|---|---|---|---|
| 3,980,949 | 9/1976 | Feldtkeller | 350/355 |
| 4,153,328 | 5/1979 | Wang | 365/122 |
| 4,560,932 | 12/1985 | Mitsui et al. | 350/376 |
| 4,609,257 | 9/1986 | Shirasabi | 350/355 |
| 4,818,080 | 4/1989 | Glasheen | 350/376 |

FOREIGN PATENT DOCUMENTS 2151807  7/1985  United Kingdom .

OTHER PUBLICATIONS

Taketani et al; "Magneto-optical Effects of Magnetic Fluid"; J. Phys. Soc. Jpn., vol. 56, #9, pp. 3362–3374, 9/87; abstract provided.
Mizullami et al.; "Magneto-optical Effect in Magnetic Fluids", Mag. Soc. of Jpn. Mtg., vol. tsms-1, #9, pp. 1085–1086, 12/85; abstr. only provided.
Taketami et al.; "Light Absorption . . . Magnetic Fluids", IEEE Transl. J. Magn. Jpn., vol. #3, No. 6, pp. 502–503, 6/88, abst. only.

*Primary Examiner*—Nelson Moskowitz
*Attorney, Agent, or Firm*—Raymond L. Owens

[57] ABSTRACT

Optical shutters having a magneto-optical material confined in a holding plate which allows a light to pass through the magneto-optical material. When the intensity of a magnetic field applied to the magneto-optical material is changed, an amount of a polarized light passing through the magneto-optical material is adjusted. A magnetic head with a coil has open ends which are disposed to face the outer surface of a shutter member. A plurality of such optical shutters are arranged to form an optical shutter array.

14 Claims, 6 Drawing Sheets

OPTICAL SHUTTER USING MAGNETO-OPTICAL MATERIALS

BACKGROUND OF THE INVENTION

1. Field of the Invention

This invention relates to an optical shutter in which a magnetic field is applied in a direction perpendicular to that of the light transmission to a magneto-optical material having a light transmissibility and exhibiting a magneto-optical effect, the intensity of the magnetic field being adjusted to control an amount of light propagating through the magneto-optical material.

2. Description of the Prior Art

In applications where a color representation is performed by controlling the balance of three colors, i.e., red, green and blue, or where a shorter wavelength range than the visible light range is utilized, for example, liquid crystal shutter arrays together with a cheap source of white light are advantageous because it is difficult to obtain laser diodes (LDs) or light emitting diode (LEDs) operable in a shorter wavelength range. Liquid crystals, though they had the problem of a low response speed, have recently had their response rate improved considerably by the discovery of ferroelectric liquid crystals and the improvements of the driving systems. There have, however, been problems in that the range of the operating temperature of the liquid crystals is very limited, and that a desired density level has not been properly realized.

Although various other types of optical shutters having also been discussed, no development of a cheap, stable and high-speed optical shutter array has, at present, been attained. This may have acted as an impediment to the development of printers, scanning systems and highly accurate display units.

General advantages (A) and disadvantages (B) of the optical shutters, such as liquid crystal shutters, and so-called active devices represented by LDs and LEDs will be pointed out below.

Liquid Crystal Shutter

A. low cost, widely available, and low power consumption.
B. low contrast ratio, normally, low response speed, and narrow range of operating temperature.

PLZT Optical Shutter

A. relatively high response speed, and high contrast ratio.
B. high cost, high voltage switching technique being required, and light transmissivity being close to zero in shorter wavelengths.

LED

A. high response speed, and easily integrated.
B. low brightness, short wavelength light being virtually unobtainable, large diffusion, and desired density level being (in the case of an array arrangement).

LD

A. relatively high response speed, and enhanced energy density narrowing a laser beam.
B. difficult integrate, and light of a short wavelength being virtually obtainable.

On the other hand, Japanese Patent Public Disclosure No. 219523/1983 published on Dec. 21, 1983 discloses a method of and apparatus for controlling an amount of light propagating through a magnetic fluid by varying the intensity of a magnetic field, based on the fact that during a time when polarized light propagates through the magnetic fluid, a phase difference between ordinary and extraordinary rays is a function of the intensity of the magnetic field at the location of the magnetic fluid when the magnetic field is applied to the magnetic fluid in a direction perpendicular to that of the propagation of the polarized light.

FIG. 1 schematically shows the arrangement of the light transmitting controlling device of the above Japanese reference. A light 100 emitted from a light source is converted by a polarizer 101 to a light having a predetermined polarization, and is propagated through a magnetic fluid 102 and another polarizer 103. Disposed above and below the magnetic fluid 102, respectively, are electromagnets 104 for producing a magnetic field 105 perpendicular to the direction of the propagation of the polarized light, thereby causing in the magnetic fluid a double refraction characteristic. By varying an amount of flow of a current through the electromagnets 104 and changing the intensity of the magnetic field applied to the magnetic fluid 102 to adjust a phase difference between ordinary and extraordinary rays propagating through the magnetic fluid 102 to an appropriate value, the magnetic fluid 102 can be in either a light interrupting state or in a light transmitting state.

In order to integrate such shutters to realize a high-density optical shutter array of, for example, 400 dpi and a microstructural, cheap and low-power-consuming optical shutter array having shutter windows of several thousand micrometers or less, there are problems caused by high current demands, crosstalk of magnetic flux occurring between adjacent optical shutters and the formation of a gap in a magnetic circuit.

SUMMARY OF THE INVENTION

The present invention was made to solve the problems of the prior art as mentioned above and has it as an object to provide optical shutter designs operable at low cost with low power consumption and high response speed in a wide range of an operating temperature, and which can provide an optical shutter array in which a plurality of such optical shutters are arranged.

To attain the above-mentioned object, a reflection-type optical shutter in accordance with the present invention comprises:

a magneto-optical material having a light transmissibility and exhibiting a magneto-optical effect;

means for holding the magneto-optical material so as to allow light to be propagated through the magneto-optical material;

a pair of polarizing means mounted on respective surfaces of the holding means;

reflector means having an inner surface mounted on an outer surface of one of the polarizing means to reflect light back to propagate through the magneto-optical material;

at least one light source provided on a side of the holding means opposite to the side on which the reflector means are mounted for illuminating the magneto-optical material; and magnetic field applying means facing the outer surface of the reflector means so as to apply a magnetic field to the magneto-optical material in a direction perpendicular to that of the light propagating through the magneto-optical material;

whereby an amount of light propagating though the magneto-optical material is regulated by adjusting the intensity of the magnetic field applied to the magneto-optical material.

When the above-described reflector means is omitted, a transmission-type optical shutter can be provided.

In one embodiment, the magnetic field applying means includes:

a magnetic head having a gap for applying the magnetic field to the magneto-optical material; and a coil wound around a portion of the magnetic head.

In the optical shutter or optical shutter array of the present invention, magnetic field is applied by the magnetic field applying means facing an outer surface of the reflector means (reflector-type shutter FIGS. 2A and 2B) or facing an outer surface of said polarizing means (transmission-type FIG. 4) and applying magnetic field in a direction perpendicular to the light passing therethrough. By adjusting the intensity of the applied magnetic field, the amount of light passing through the material can be regulated.

The present invention brings forth such remarkable advantages as described below:

1. since it is possible to achieve an optical shutter and optical shutter array having a response speed of several microseconds, a high-speed switching operation is possible, thereby allowing the optical shutter and shutter array to be applied to various technical fields, such as high-speed optical printers, optical computers, sensors, display units, etc.;

2. since the amount of light passing through the magnetic fluid can be regulated only by controlling the current flowing through the coil, easily operable optical shutters and optical shutter arrays can be provided;

3. since the intensity of the magnetic field applied to the magnetic fluid and the amount of light passing therethrough are generally in a linear relationship with each other, an optical shutter array which can be operated as an optical modulator for arbitrarily setting an amount of light passing through the magnetic fluid in response to the current flowing through the coil can be provided for use in a density level-type color optical printer; and 4. since it is possible to manufacture the bodies of the optical shutters and optical shutter arrays using semiconductor manufacturing techniques, the magnetic field can be accurately and efficiently applied even to a magnetic fluid confined in an extremely small area.

Other features and advantages of the invention will become clear from the following description taken in conjunction with the accompanying drawings.

DESCRIPTION OF THE PREFERRED EMBODIMENTS

Figure 1:
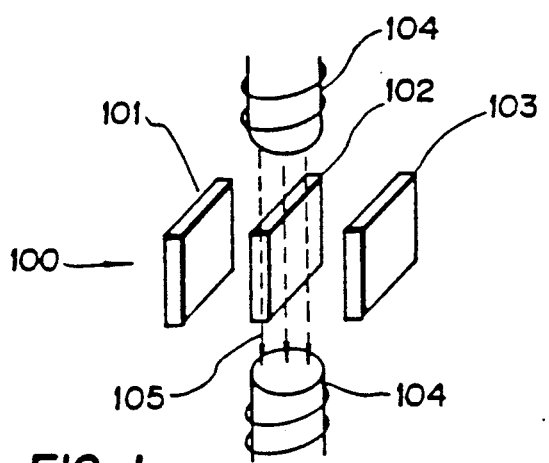
FIG. 1 is a perspective schematically showing the essential part of light transmission controlling device of the prior art.

Various embodiments of the present invention will now be described. The optical shutters are classified into a reflection-type and a transmission-type.

An essential difference therebetween is whether or not a light source is disposed on the same side as that of target (observing position). In the following description, the same reference numerals designate similar components.

Figure 2A:
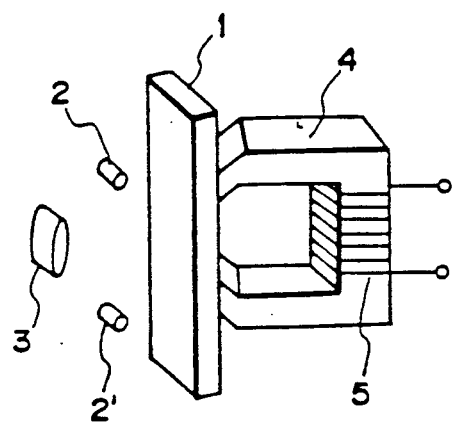
FIG. 2A is a perspective schematically showing the arrangement of a reflection-type optical shutter of the first embodiment of an optical shutter in accordance with the present invention.
Figure 2B:
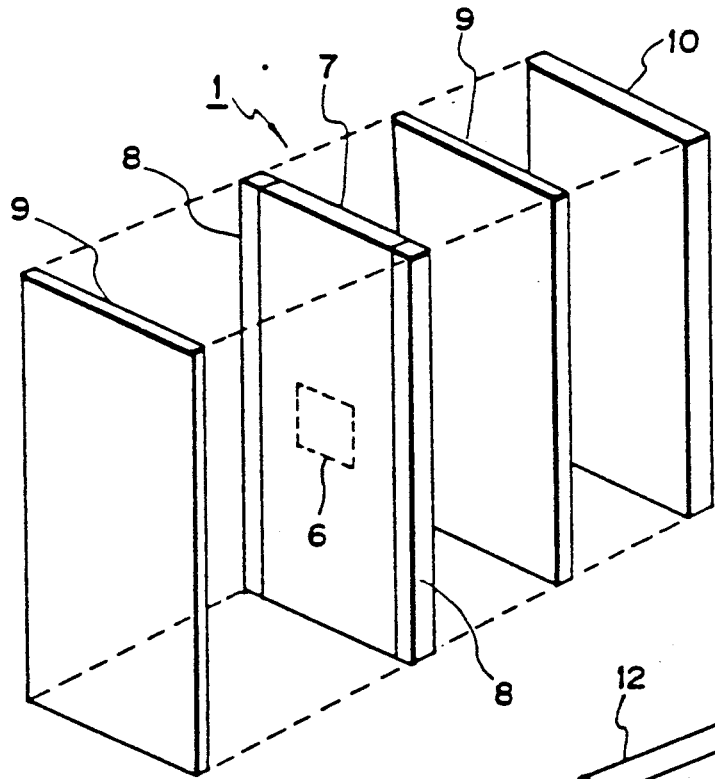
FIG. 2B is an exploded perspective of the essential part of the optical shutter FIG. 2A.
Figure 2C:
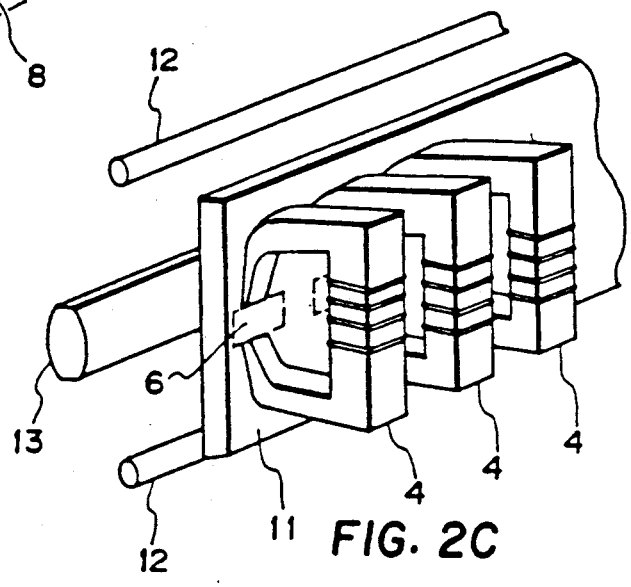
FIG. 2C is a perspective of an optical shutter array using the optical shutters of FIG. 2A.

FIG. 2A is a perspective view schematically showing the arrangement of the first embodiment of an optical shutter in accordance with the present invention which is embodied as a reflection-type optical shutter. FIG. 2B is an exploded perspective view of the essential part of the optical shutter. FIG. 2C is a perspective view of a reflection-type optical shutter array including a plurality of such optical shutters.

The reflection-type optical shutter of the first embodiment is provided with a flat plate-like reflection-type optical shutter body 1 in which a light transmissive magnetic fluid of a width of several micrometers to several ten micrometers is confined. Disposed opposite to one surface of the optical shutter body are two light sources 2, 2 for illuminating the magnetic fluid in the body 1. Various illuminating elements can be used as the light sources 2, such as fluorescent lamps, laser sources, LEDs, optical fibers, halogen lamps, xenon lamps, mercury arc lamps, etc. Positioned between the light sources 2 and 2 and parallel to the reflection-type optical shutter body 1 is a lens 3 for focusing the light reflected by the body 1 to its focal point.

Also disposed on the other surface of the body 1 is a C-shaped magnetic head 4 which has a gap for allowing the magnetic field to be applied to and penetrate the magnetic fluid in the body 1 in a direction perpendicular to that of the light propagating through the body 1. A coil 5 is wound around the head for exciting it. The magnetic head 4 and the coil 5 constitute a magnetic field applying means. The open ends of the magnetic head 4 can be bent towards each other to reduce the gap therebetween to provide a stronger magnetic field. Ordinarily, the width of the gap of the magnetic head is several micrometers to several millimeters.

As shown in FIG. 2B, the reflection-type optical shutter body 1 comprises a holding plate 7 having on the inside thereof a hollow in which a light-transmissive magnetic fluid 6 is contained. The remaining portion of the holding plate encircling the hollow is opaque. An example of the holding plate 7 is shown in the above described Japanese Patent Public Disclosure No. 219523/83 wherein a magnetic fluid is contained in an opening formed in the center of a spacer which is then sandwiched between transparent substrates such as sheet of glass to form a holding plate. Mounted on opposite sides of holding plate 7 are magnetic shielding plates 8, for reducing any crosstalk which may be caused when a plurality of such optical shutters are arranged side by side. A pair of polarizing plates 9 is provided to hold therebetween the holding plate 7 and the magnetic shielding plate 8. One outer surface of one of the polarizing plates is attached with a reflecting mirror 10 with an inner reflecting surface. Light is reflected back through the magnetic field and is collected by the lens 3. Accordingly, light propagates in two directions through the magnetic material. The open ends of the magnetic head face the outer surface of the mirror 10 for applying the magnetic field.

Thus, when a current flow through the coil 5, a magnetic circuit is formed along a path of "the magnetic head 4→the magnetic fluid 6→the magnetic head 4," and thus the magnetic field is applied to the magnetic fluid 6 in a direction perpendicular to that of the propagation of the light. Accordingly, the amount of light propagating through the magnetic fluid 6 can be regulated by adjusting the intensity of the current flowing through the coil 5.

The optical shutters, as shown in FIG. 2A, can be linearly or two-dimensionally arranged. FIG. 2C shows an example of a reflection-type optical shutter array in which the optical shutters are linearly arranged. The reflection-type optical shutter bodies, the light sources and the lenses are respectively integrated to form an elongated reflection-type optical shutter array body 11, light sources 12 and a lens 13. A plurality of magnetic head 4, 4, 4 . . . are provided corresponding to the respective magnetic fluids 6.

Figure 3A:
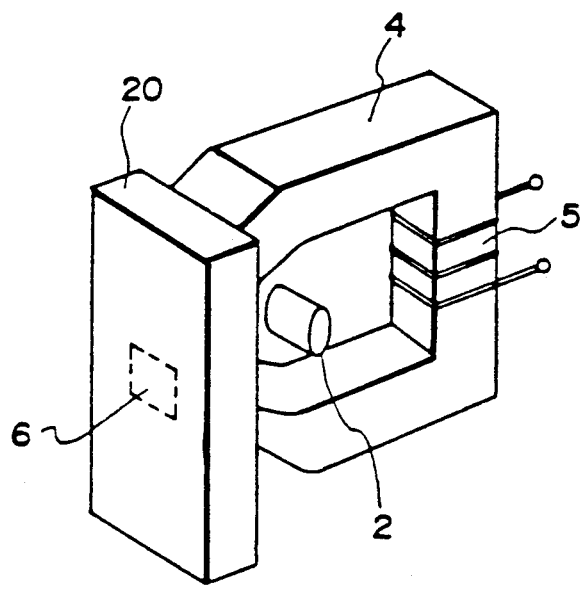
FIG. 3A is a perspective schematically showing the arrangement of a transmission-type optical shutter of the second embodiment of an optical shutter in accordance with the present invention.
Figure 3B:
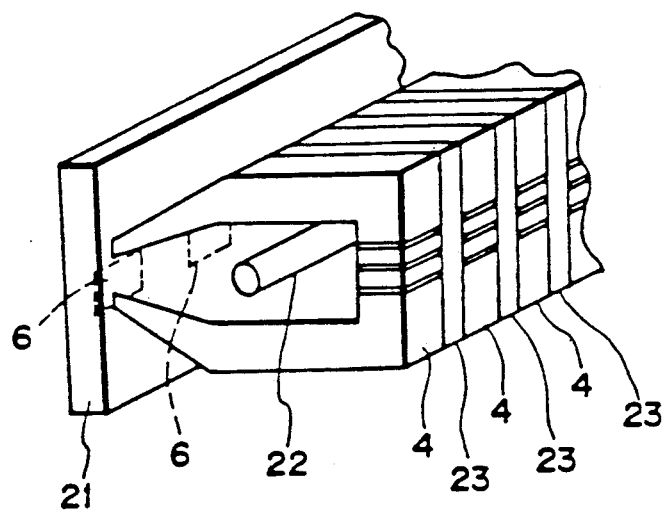
FIG. 3B is a perspective view of an optical shutter array using the optical shutters of FIG. 3A.

When the reflecting mirror of the first embodiment is omitted, a transmission-type optical shutter and shutter array can be provided. FIG. 3A is a perspective schematically showing the second embodiment of an optical shutter of the present invention and FIG. 3B is a perspective showing an optical shutter array in which such optical shutters are linearly arranged. Adjacent to one surface of a transmission-type optical shutter body 20 corresponding to the reflection-type optical shutter body 1 of FIG. 2A but without the reflecting mirror 10, the magnetic head 4 around which the coil 5 is wound is provided, and the light source 2 is positioned between two arms of the magnetic head 4 to face the body 20.

The optical shutter array of FIG. 3B is comprised of a transmission-type optical shutter array body 21 and an elongated light source 22, and a plurality of magnetic heads 4, are provided on or in proximity to one of the outer surface of the body 21. Further provided between the adjacent magnetic heads are magnetic shielding plates 23, for reducing crosstalk of magnetic fluxes.

In the second embodiment, a magnetic circuit similar to that of the first embodiment is formed to apply the magnetic filed to the magnetic fluid 6, and the amount of light passing through the magnetic fluid 6 from the light source 2 is regulated in response to the intensity of the applied magnetic field.

Figure 4A:
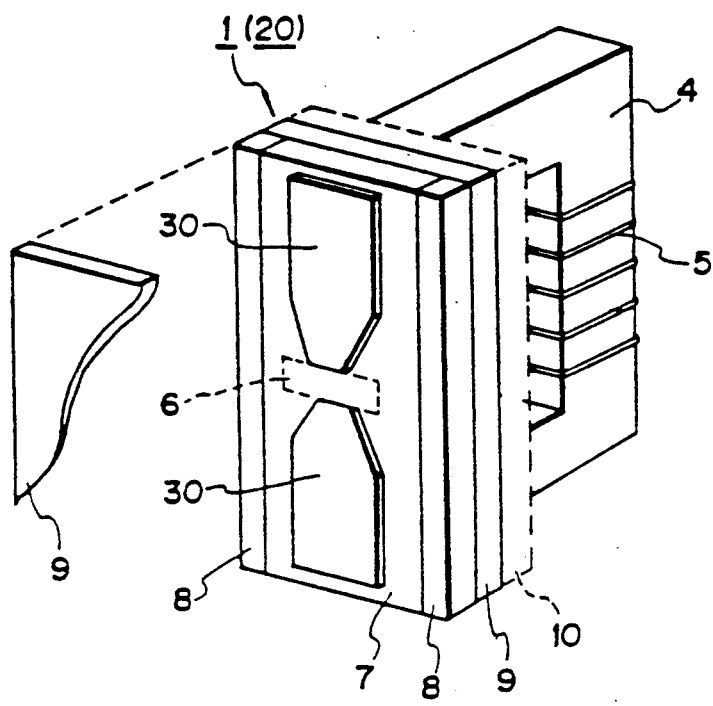
FIG. 4A is an exploded perspective schematically showing the arrangement of the third embodiment of an optical shutter in accordance with the present invention.
Figure 4C:
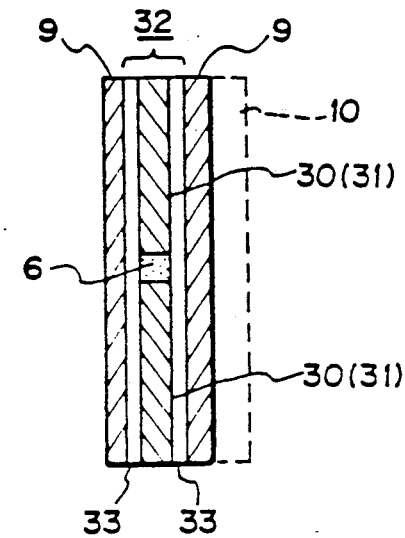
FIG. 4C is a sectional view of the essential part of another modification of the optical shutter of FIG. 4A.
Figure 4B:
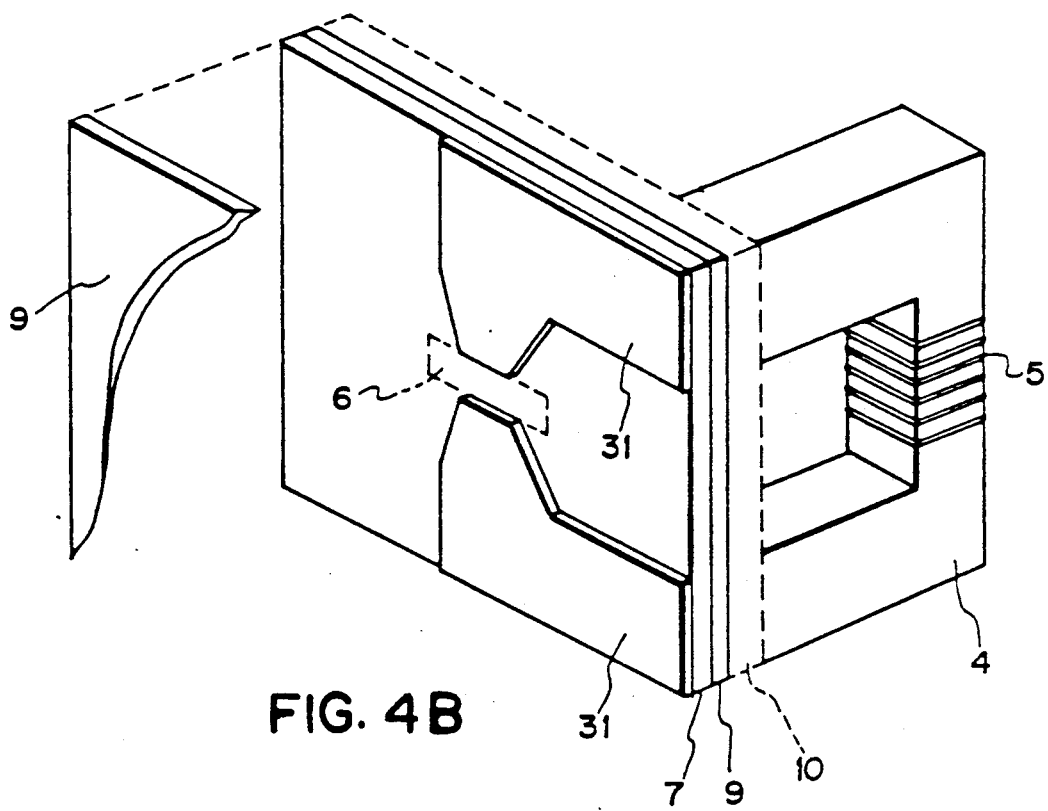
FIG. 4B is an exploded perspective view of a modification of the optical shutter of FIG. 4A.

The inwardly bent ends of the magnetic head for enhancing the magnetic field applied to the magnetic fluid have already been described. Alternatively, thin magnetic films can be used as shown in FIGS. 4A and 4B, FIG. 4A being an exploded perspective schematically showing the arrangement of the third embodiment of an optical shutter of the present invention and FIG. 4B being an exploded perspective of a modification of the optical shutter of FIG. 4A. In these drawings, the reflecting mirror 10 is indicated by dotted lines in order to show a reflection-type optical shutter having the reflecting mirror 10 and a transmission-type optical shutter without the mirror 10.

Referring to FIG. 4A, a pair of this magnetic films 30 having a thickness of several micrometers to several thousand micrometers, for example, is attached to one surface of the holding plate 7 and spaced from each other a distance equal to the width of the magnetic fluid 6. The outer ends of the films 30 are respectively positioned corresponding to the ends of the magnetic head 4. A plurality of such optical shutters can linearly or two-dimensionally be arranged to form an optical shutter array.

In the modification FIG. 4B, the shape of the magnetic films and the position of the magnetic head are changed. In this figure, each of a pair of thin magnetic films 31 includes a longitudinal side and a lateral side bent therefrom at an angle of about 90 degrees. The longitudinal sizes interpose the magnetic fluid 6. The ends of the lateral sides are respectively positioned corresponding to the ends of the magnetic head 4.

In FIGS. 4A and 4B, instead of attaching the magnetic films 30 to one surface of the holding plate 7, these films and the magnetic fluid may be sandwiched between transparent substrates, such as sheets of glass, and then polarizing plates are bonded to the outer surfaces of the substrates. Namely, the holding plate 7 can be formed by taking the steps of 1) adhering a pair of magnetic films to a first transparent substrate so as to form a gap portion of a predetermined length between the films, 2) coating an adhesive on the first substrate around the films without filling the gap portion with the adhesive, 3) placing a second transparent substrate on the first substrate to bond both of them, 4) injecting a magnetic fluid into the gap portion, and 5) sealing both sides of the gap portion with an adhesive. FIG. 4C is a sectional view of an example of the optical shutter body having a holding plate 32 formed in such a manner as just described above, the films 30 and the magnetic fluid 6 being held between transparent substrates 33 and 33.

In this embodiment, it is also necessary to arrange the light source or sources and lens (not shown in FIGS. 4A and 4B for clarity) for operating the optical shutter. In the case of the reflection-type shutter they are positioned opposite to the magnetic head 4 with respect to the optical shutter body 1 (20), and in the case of the transmission-type shutter the light source is positioned between two arms of the magnetic head 4 to face the optical shutter body 1 (20).

Embodiments will now be described which employ the above-described process of manufacturing the holding plate for interposing the magnetic films and the magnetic fluid between the transparent substrates.

Figure 5B:
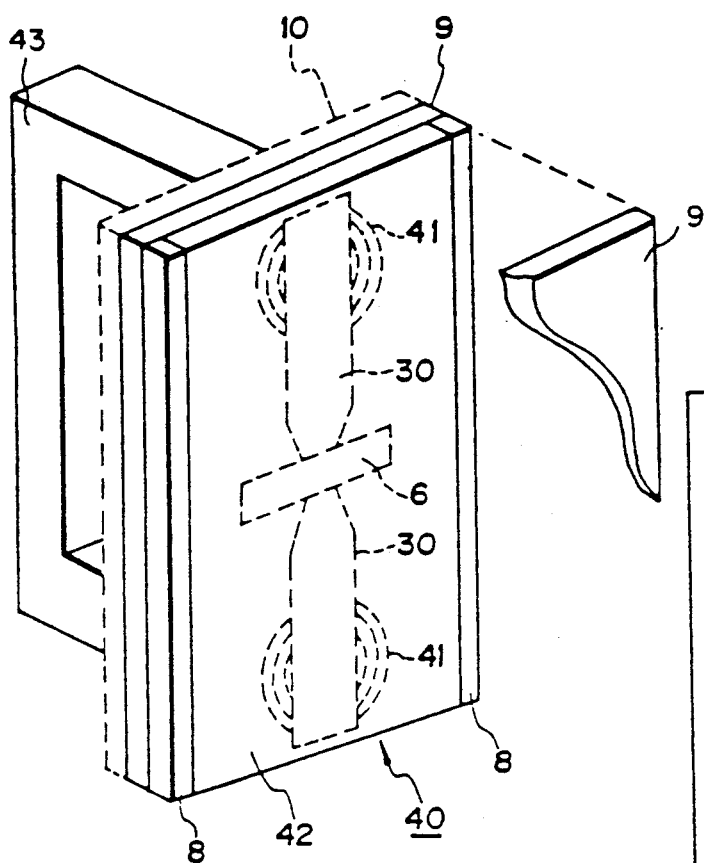
FIG. 5B is an exploded perspective of the optical shutter of FIG. 5A.
Figure 5A:
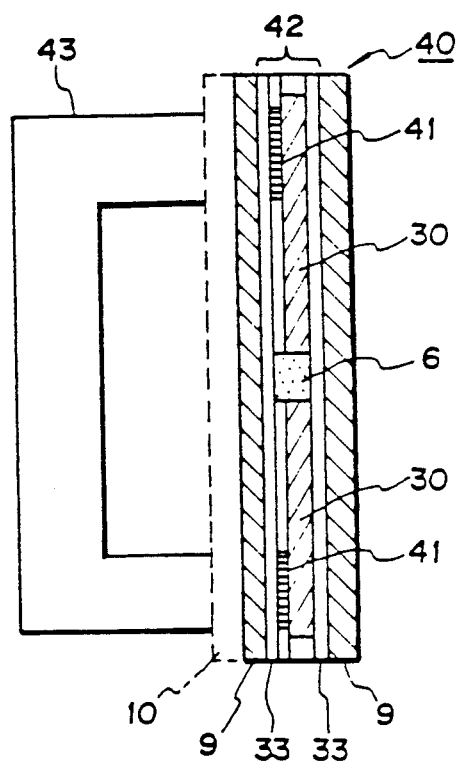
FIG. 5A is a sectional view of the essential part of the fourth embodiment of an optical shutter in accordance with the present invention.
Figure 5C:
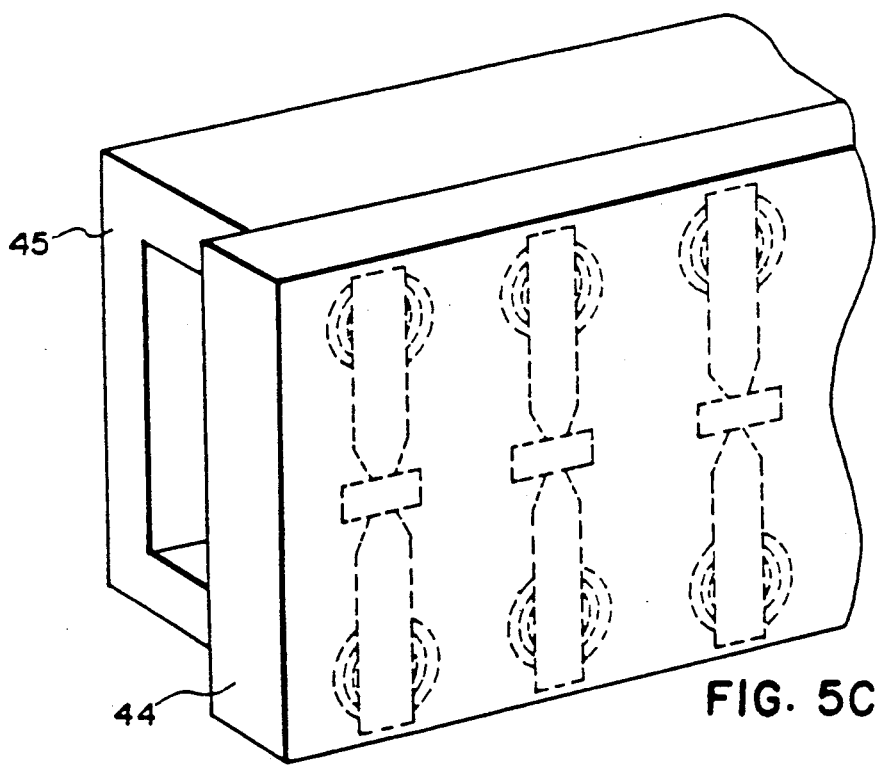
FIG. 5C is perspective of the optical shutter array using the optical shutters of FIG. 5A.

FIGS. 5A and 5B are a sectional view and an exploded perspective, respectively, schematically showing the arrangement of the fourth embodiment of an optical shutter of the invention, and FIG. 5C is a perspective showing an optical shutter array using such optical shutters. Also in this embodiment, the reflecting mirror 10 is shown by dotted lines; reflection-type optical shutter and shutter array have the mirror 10 whereas transmission-type have not.

In FIGS. 5A and 5B, an optical shutter body 40 includes a holding plate 42 in which the thin magnetic films 30, magnetic fluid 6 and a pair of coils 41 are interposed between the transparent substrates 33. The coils 41 are respectively positioned to correspond to the ends of the magnetic films and are shaped so as to be flat in a spiral or helical configuration. A pair of polarizing plates 9 are attached to both surfaces of the holding plate 42, and the reflecting mirror 10, if necessary, is provided on an outer surface of one of the polarizing plates. Further, a C-shaped magnetic path forming member 43 is made of a magnetic material (ferrite, for example) is provided to extend across the pair of coils 41, in contact with an outer surface of the polarizing plate 9 (or the reflecting mirror 10), in order to form a magnetic path between the coils 41.

Thus, a magnetic circuit is formed along a path of "upper coil 41→upper film 30→magnetic fluid 6→lower film 30→lower coil 41→member 43→upper coil 41" for applying the magnetic field to the magnetic fluid 6 in a direction perpendicular to that of the propagation of the light through the magnetic fluid, so that the amount of light can be regulated by adjusting the intensity of the magnetic field.

Instead of the provision of the flat coils 41, coils may be would around the magnetic films 30.

Referring to FIG. 5C, a plurality of such optical shutter bodies 40 is integrally arranged to constitute an optical shutter array body 44, and the magnetic path forming members are also integrated to form a single channel-shaped magnetic path forming member 45.

In this embodiment, it is also necessary to arrange the light source or sources and the lens (not shown in FIGS. 5A and 5B for clarity) for operating the optical shutter and shutter array. In the case of the reflection-type shutter and shutter array the light source(s) and the lens are positioned opposite to the magnetic path forming members 43, 45 with respect to the optical shutter body 40 and the optical shutter array body 44. In the case of the transmission-type shutter and shutter array, the light source is positioned between two arms of the members 43, 45.

In the embodiments described so far, the magnetic head and the magnetic path forming member have the arms protruding to the flat optical shutter body or optical shutter array body. If magnetic films are appropriately shaped and a flat coil is used, however, it is possible to realize a flat optical shutter and a flat optical shutter array.

Figure 6A:
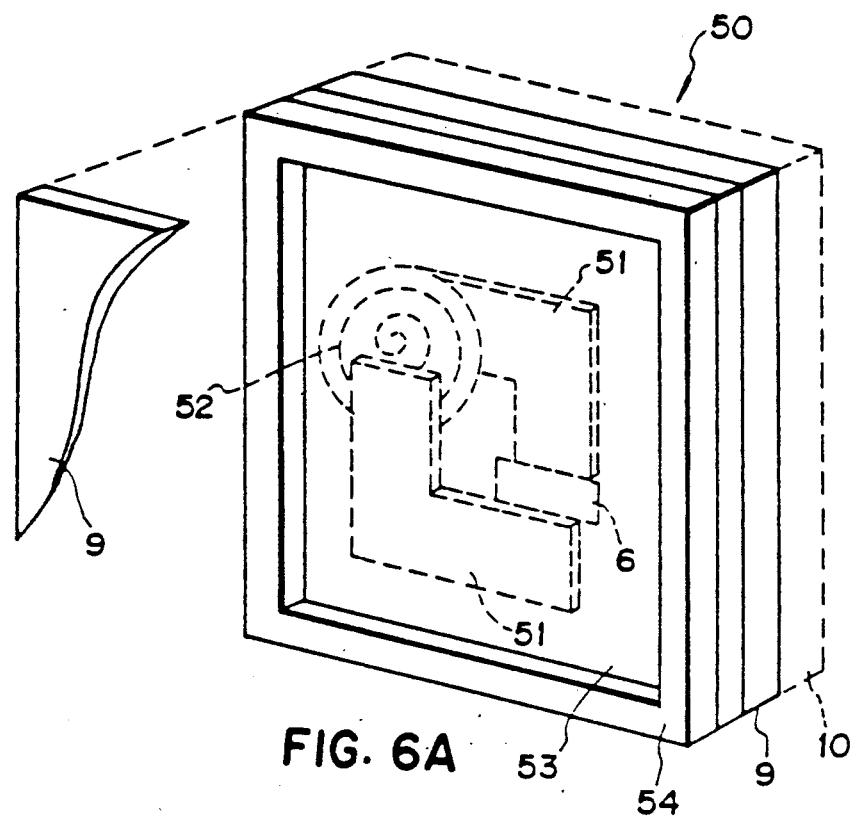
FIG. 6A is an exploded perspective schematically showing the arrangement of the fifth embodiment of an optical shutter in accordance with the present invention.
Figure 6B:
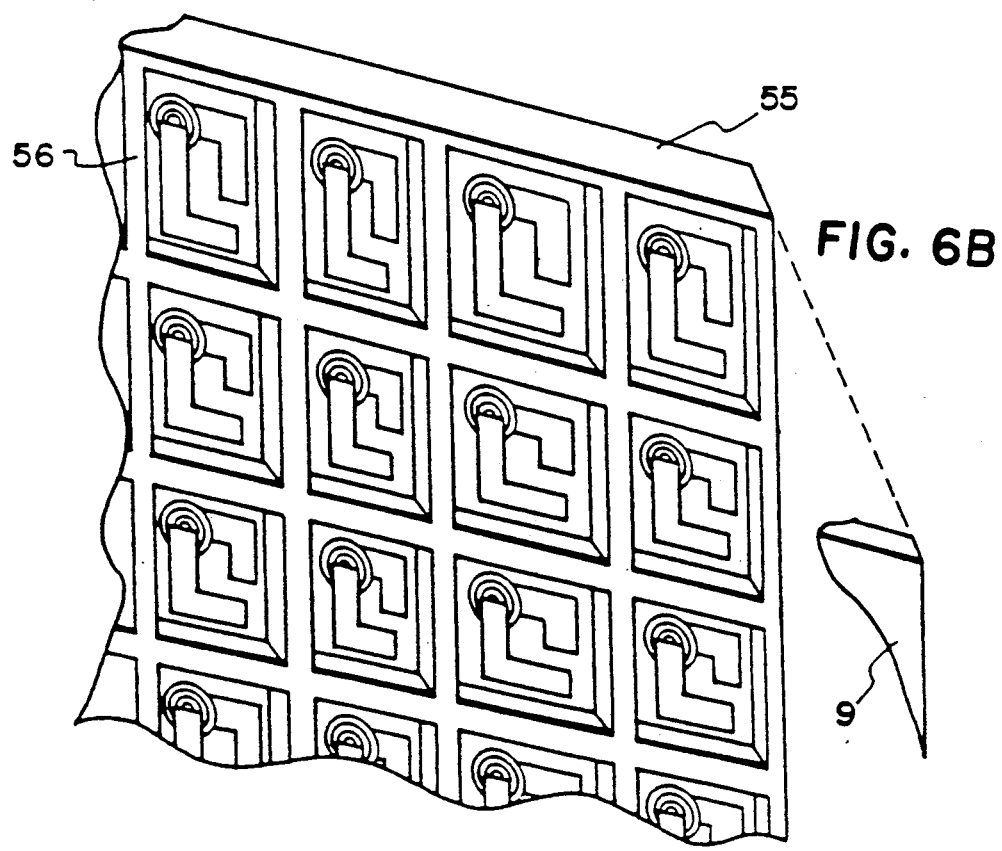
FIG. 6B is a perspective of an optical shutter array using the optical shutters of FIG. 6A.

FIG. 6A is an exploded view in perspective schematically showing the arrangement of the fifth embodiment of an optical shutter of the invention and FIG. 6B is a perspective view of an optical shutter array in which such optical shutters are two-dimensionally arranged. In this embodiment, the reflecting mirror 10 is also shown in dotted lines; if the mirror is assembled, the shutter and shutter array are of a reflection-type whereas transmission-type shutter(s) and shutter array(s) do not have any mirror.

Referring to FIG. 6A, an optical shutter body 50 includes a holding plate 53 in which the magnetic fluid 6, a pair of L-shaped magnetic films 51, and a coil 52 are interposed between a pair of transparent substrates (not shown). The films 51 are positioned to form a rectangle, the magnetic fluid 6 being positioned between an end edge of one side of one magnetic film and an edge of one side of the other magnetic film, and the flat coil 52 being positioned between the other sides of the films 51.

Thus, a magnetic circuit is formed along a path of "coil 52→one of the magnetic films 51→magnetic fluid 6→the other of the magnetic films 51→coil 52" for applying the magnetic field to the magnetic fluid 6 in a direction perpendicular to that of propagation of the light, so that the amount of light propagating through the magnetic fluid can be regulated by adjusting the intensity of the magnetic field.

Attached along the peripheral edges of the holding plate 53 is a magnetic shielding member 54 surrounding the magnetic films 51 and the magnetic fluid 6 to reduce a crosstalk caused between adjacent shutters when a plurality of such optical shutters are arranged to form an optical shutter array.

Referring to FIG. 6B, a plurality of such optical shutter bodies 50 are integrated together to constitute an optical shutter array body 55, and magnetic shielding plates 56 are provided between adjacent optical shutters to prevent crosstalk of the magnetic fluxes therebetween. In this embodiment, the light source or sources and the lens are omitted for the same of clarity.

Figure 7A:
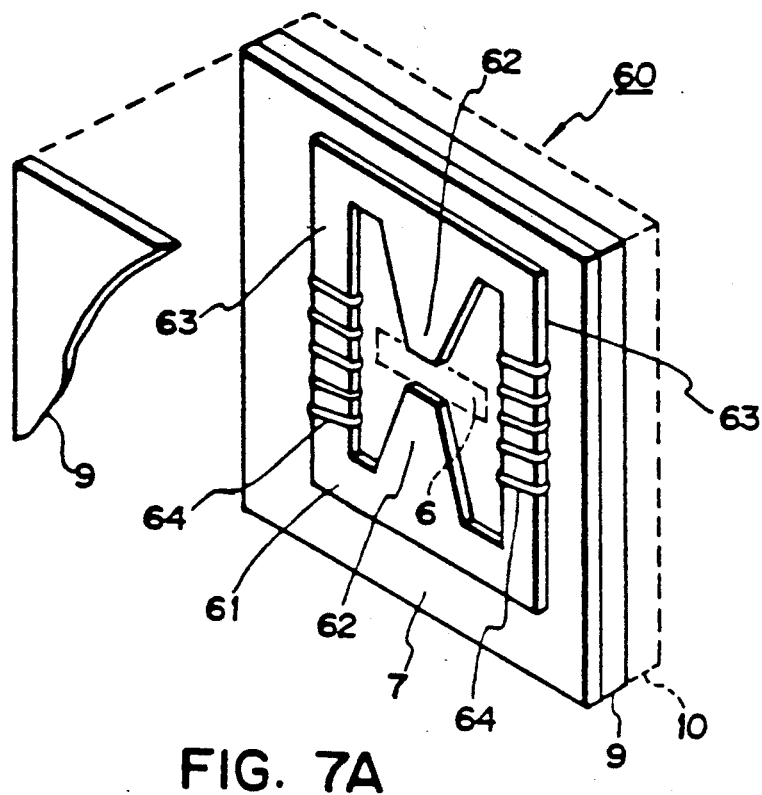
FIG. 7A is an exploded perspective schematically showing the arrangement of an optical shutter in accordance with the present invention.
Figure 7B:
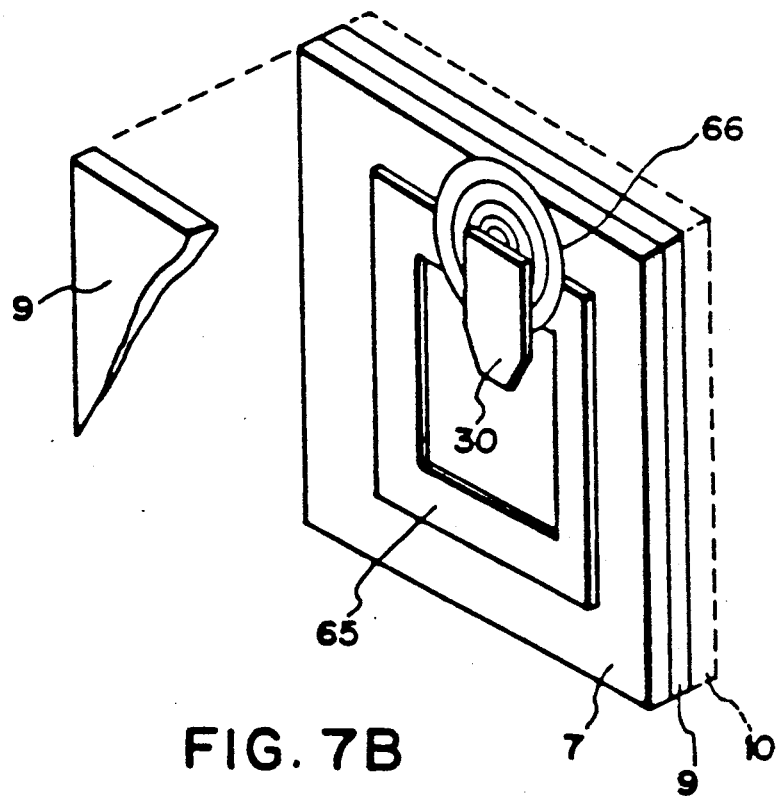
FIG. 7B is an exploded perspective of a modification of the optical shutter of FIG. 7A.

In the embodiments described so far, the optical shutter arrays employ the magnetic shielding plates to reduce crosstalk of the magnetic fluxes, but such magnetic shielding plates can be eliminated by changing the configuration of the magnetic films. FIG. 7A is an exploded view in perspective schematically showing the arrangement of the sixth embodiment of the optical shutter of the invention and the FIG. 7B is a perspective view showing the arrangement of a modification thereof. In this embodiment, the reflecting mirror 10 is also indicated by dotted lines; if the mirror is assembled, the shutter and shutter array are of reflection types and whereas transmission-type shutter and shutter array do not have any mirror.

In the embodiment of FIG. 7A, the holding plate 7 of FIG. 2B is used, and an optical shutter body 60 includes a magnetic film 61 attached to one surface of the holding plate 7. The magnetic film 61 is cut away to define a generally H-shaped configuration, thereby forming a pair of opposing protrusions 62, and left and right sides 63, as viewed in FIG. 7A. The magnetic fluid 6 is positioned in a gap defined between the ends of the protrusions 62, and coils 64 are respectively wound around the left and right sides 63.

Thus, when the coils 64 are energized, a magnetic circuit is formed along a path of "right side coil 64→upper protrusion 62→magnetic fluid 6→lower protrusion 62→right side coil 64" and along a path of "left coil 64→upper protrusion 62→magnetic fluid 6→lower protrusion 62→left coil 64" for applying the magnetic field to the magnetic fluid 6 in a direction perpendicular to that of propagation of the light, so that the amount of light propagating through the magnetic fluid can be regulated by adjusting the intensity of the magnetic field, a similar to the other embodiments described above.

Referring to FIG. 7B, instead of the H-shaped magnetic film 61 of FIG. 7A, a rectangular frame-like magnetic film 65 is used. The magnetic film 65 is bonded to the holding plate 7 and also provided on its upper side with a flat coil 66. An elongated magnetic film 30 is provided to overlap the coil 66. In this case, the magnetic fluid 6 is confined in a portion of the holding plate 7 between the lower end of the elongated magnetic film 30 and the lower side of the frame-like magnetic film 65.

It is possible for coils to be provided on the upper and lower sides, respectively, of the frame-like magnetic film 65 and elongated magnetic films are provided so as to overlap the respective coils to form a gap for applying the magnetic filed to the magnetic fluid.

In the embodiments shown in FIGS. 7A and 7B, since the magnetic films 61 and 65 are formed in frame-like configurations, the magnetic shielding plate or plates required to prevent the crosstalk of the magnetic fluxes can be advantageously eliminated.

For implementing a reflection type optical shutter using the shutter body 60, light source or sources and a lens are positioned outside one of the polarizing plates 9, and for implementing a transmission-type optical shutter, a light source may be positioned on either side of the optical shutter body 60. Of course, a plurality of such optical shutters as described in connection with the sixth embodiment can linearly or two-dimensionally be arranged to form an optical shutter array.

It is noted that for implementing the third to sixth embodiments the semiconductor manufacturing technique can be utilized. The magnetic films 30, 31, 51, 61, 65 and the coils 41, 52, 66 can be formed solely or laminated in sequence on the transparent substrate using the semiconductor manufacturing technique. As a result, the magnetic field can accurately and efficiently be generated in an extremely small area, thereby realizing optical shutters and optical shutter arrays which are low cost and driven by a low current and capable of a high speed switching operation.

The present invention has been described in detail with particular reference to certain embodiments thereof, but it will be understood that variations and modifications can be effected within the spirit and scope of the invention. For example, only the embodiments using the light transmissive magnetic fluid have been described, but any magneto-optical material which can vary the transmissibility in response to the intensity of the magnetic field applied in a direction perpendicular to that of propagation of the light can be utilized instead of such a magnetic fluid. If fine particles of an electrically conductive material, such as copper, are dispersed in such magneto-optical material, a shutter element for a microwave can be made.

I claim:

1. A reflective optical shutter comprising:
   magneto-optical material having a light transmissibility and exhibiting a magneto-optical effect;
   means for holding said magneto-optical material so as to allow light to propagate through said magneto-optical material;
   a pair of polarizing means mounted on respective surfaces of said holding means;
   reflector means having a major inner surface area mounted on an outer surface of one of said polarizing means to reflect light back to propagate through the magneto-optical material and having a major outer surface area;
   at least one light source provided on a side of said holding means opposite to the side on which said reflector means are mounted for illuminating said magneto-optical material; and
   magnetic field applying means having a head with a coil, the head having open ends which are disposed facing the outer major surface area of said reflector means so as to apply a magnetic field in response to current in the coil to said magneto-optical material in a direction perpendicular to that of the light propagating through said magneto-optical material;
   whereby the amount of light propagating through said magneto-optical material is regulated by adjusting the intensity of said magnetic field applied to said magneto-optical material.

2. An optical shutter as set forth in claim 1, wherein said magnetic field applying means comprises:
   a magnetic head having a gap for applying said magnetic field to said magneto-optical material; and
   a coil would around a portion of said magnetic head.

3. An optical shutter as set forth in claim 2, further comprising a pair of thin magnetic films provided on said holding means to be spaced apart from each other in the direction of said magnetic field applied to said magneto-optical material to interpose said magneto-optical material therebetween.

4. A transmission-type optical shutter comprising:
   magneto-optical material having a light transmissibility and exhibiting a magneto-optical effect;
   holding means for holding said magneto-optical material so as to allow light to pass through said magneto-optical material;
   a pair of polarizing means, each of said polarizing means having inner and outer major surface areas with the inner major surface area of each polarizer means being mounted on respective surfaces of said holding means;
   magnetic field applying means having a head with a coil, the head having open ends which are disposed facing an outer major surface area of one of said polarizing means to apply a magnetic field in response to current in the coil to said magneto-optical material in a direction perpendicular to that of the light passing through said magneto-optical material; and
   at least one light source disposed between one of said polarizing means and said magnetic filed applying means for illuminating said magneto-optical material;
   whereby the amount of light passing through said magneto-optical material is regulated by adjusting the intensity of said magnetic field applied to said magneto-optical material.

5. An optical shutter as set forth in claim 4, wherein said magnetic field applying means include:
   a magnetic head having a gap for applying said magnetic filed to said magneto-optical material; and
   a coil wound around a portion of said magnetic head.

6. An optical shutter as set forth in claim 5, further comprising a pair of thin magnetic films provided on said holding means to be spaced apart from each other in the direction of said magnetic field applied to said magneto-optical material to interpose said magneto-optical material therebetween.

7. A reflective optical shutter comprising:
   magneto-optical material having a light transmissibility and exhibiting a magneto-optical effect;

holding means for holding said magneto-optical material so as to allow light to propagate through said magneto-optical material;

a pair of thin magnetic films provided on said holding means to be spaced apart from each other to allow a magnetic field to be applied to said magneto-optical material in a direction perpendicular to that of the light propagating through said magneto-optical material;

a pair of flat coils provided for said magnetic films, respectively;

a pair of polarizing means provided to interpose therebetween said holding means, said pair of magnetic films and said coils;

reflector means having a major inner surface area mounted on an outer surface of one of said polarizing means and having a major outer surface area;

magnetic flux path forming means provided on the outer major surface area of said reflector means for allowing a magnetic flux path passing through said pair of magnetic films to be formed; and at least one light source disposed opposite to said magnetic flux path forming means with respect to said magneto-optical material for illuminating the latter;

whereby the amount of light propagating through said magneto-optical material is regulated by adjusting the intensity of said magnetic field applied to said magneto-optical material.

8. An optical shutter comprising:

magneto-optical material having a light transmissibility and exhibiting a magneto-optical effect;

holding means for holding said magneto-optical material so as to allow light to pass through said magneto-optical material;

a pair of thin magnetic films provided on said holding means to be spaced from each other in a direction perpendicular to that of the light passing through said magneto-optical material to allow the magnetic field to be applied to said magneto-optical material;

a pair of flat coils provided for said magnetic films, respectively;

a pair of polarizing means, each of said polarizing means having major inner and outer surface areas with the inner major surface area of each polarizing means being mounted on opposite surfaces of said holding means, said polarizing means provided to interpose therebetween said holding means, said pair of magnetic films and said coils;

magnetic flux path forming means provided on the major outer surface area of one of said polarizing means for allowing a magnetic flux path passing through said pair of the magnetic films to be formed; and at least one light source disposed between one of said polarizing means and said magnetic flux path forming means for illuminating said magneto-optical material;

whereby the amount of light passing through said magneto-optical material is regulated by adjusting the intensity of said magnetic field applied to said magneto-optical material.

9. An optical shutter comprising:

magneto-optical material having a light transmissibility and exhibiting a magneto-optical effect;

holding means for holding said magneto-optical material so as to allow light to pass through said magneto-optical material, said holding means having a pair of opposed major outer surface areas;

a pair of L-shaped thin magnetic films provided on one of said major outer surface areas of said holding means to form a gap in which said magneto-optical material is positioned;

a flat coil interposed between the ends of said pair of magnetic films for magnetically exciting said pair of magnetic films to apply a magnetic field to said magneto-optical material in a direction perpendicular to that of the light passing through said magneto-optical material;

a pair of polarizing means provided to interpose therebetween said holding means, said pair of magnetic films and said flat coil; and at least one light source for illuminating said magneto-optical material;

whereby an amount of the light passing through said magneto-optical material is regulated by adjusting the intensity of said magnetic field applied to said magneto-optical material.

10. An optical shutter as set forth in claim 9, further comprising a reflector means attached to an outer surface of one of said pair of polarizing means so as to reflect back the light emanated by said at least one light source and passing through said magneto-optical material.

11. An optical shutter comprising:

magneto-optical material having a light transmissibility and exhibiting a magneto-optical effect;

holding means for holding said magneto-optical material to allow a light to pass through said magneto-optical material, said holding means having a pair of opposed major outer surface areas;

a thin magnetic film provided on one of said major outer surface areas of the holding means, said film having an inner H-shaped opening to form a pair of opposing protrusions so as to dispose said magneto-optical material therebetween;

coil means provided on said magnetic film to allow a magnetic field to be applied to said material in a direction perpendicular to that of the light passing through said material;

a pair of polarizing means provided to interpose therebetween said holding means, said magnetic film and said coil means; and at least one light source for illuminating said magneto-optical material;

whereby the amount of light passing through said magneto-optical material is regulated by adjusting the intensity of said magnetic field applied to said magneto-optical material.

12. An optical shutter as set forth in claim 11, further comprising reflector means attached to an outer surface of one of said pair of polarizing means so as to reflect back the light emanated by said at least one light source and passing through said magneto-optical material.

13. An optical shutter comprising:

magneto-optical material having a light transmissibility and exhibiting a magneto-optical effect;

holding means for holding said magneto-optical material to allow light to pass through said magneto-optical material, said holding means having a pair of opposed major outer surface areas;

a first thin magnetic film provided on one of said major outer surface areas of said holding means, said first film being of a frame-like configuration having an inner rectangular opening;

a flat coil placed on one side of said first film;
a second magnetic film placed on said coil such that the one end of said second film faces said magneto-optical material;
a pair of polarizing means provided to interpose therebetween said holding means, said first and second magnetic films and said coil; and
at least one light source for illuminating said magneto-optical material;

whereby an amount of the light passing through said magneto-optical material is regulated by adjusting the intensity of said magnetic field applied to said magneto-optical material.

14. An optical shutter as set forth in claim 13, further comprising a reflector means attached to an outer surface of one of said pair of polarizing means so as to reflect back the light emanated by said at least one light source and passing through said magneto-optical material.

* * * * *